US010497512B2

United States Patent
Tauchi et al.

(10) Patent No.: US 10,497,512 B2
(45) Date of Patent: *Dec. 3, 2019

(54) DIELECTRIC COMPOSITION, DIELECTRIC ELEMENT, ELECTRONIC COMPONENT AND LAMINATED ELECTRONIC COMPONENT

(71) Applicant: TDK Electronics AG, München (DE)

(72) Inventors: Goushi Tauchi, Tokyo (JP); Masakazu Hirose, Tokyo (JP); Tomoya Imura, Tokyo (JP); Tomohiro Terada, Tokyo (JP)

(73) Assignee: TDK ELECTRONICS AG, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/745,683

(22) PCT Filed: Jun. 16, 2016

(86) PCT No.: PCT/EP2016/063859
§ 371 (c)(1),
(2) Date: Jan. 17, 2018

(87) PCT Pub. No.: WO2017/012791
PCT Pub. Date: Jan. 26, 2017

(65) Prior Publication Data
US 2018/0211778 A1 Jul. 26, 2018

(30) Foreign Application Priority Data

Jul. 17, 2015 (JP) .................................. 2015-143358

(51) Int. Cl.
*C04B 35/475* (2006.01)
*H01G 4/12* (2006.01)
(Continued)

(52) U.S. Cl.
CPC ......... *H01G 4/1218* (2013.01); *C04B 35/462* (2013.01); *C04B 35/4682* (2013.01);
(Continued)

(58) Field of Classification Search
CPC .... C04B 35/47; C04B 35/475; H01G 4/1218; H01G 4/1227
See application file for complete search history.

(56) References Cited

U.S. PATENT DOCUMENTS 6,292,354 B1    9/2001  Kobayashi et al.
6,656,865 B2 *  12/2003 Saito ..................... C04B 35/468
                                                              361/321.2
(Continued)

FOREIGN PATENT DOCUMENTS

JP    2002080276 A    3/2002
JP    2004182532 A    7/2004
(Continued)

OTHER PUBLICATIONS

Vintila et al Effect of A-Site Substitutions on the Microstructure and Dielectric Properties of Bismuth Sodium Titanate Based Ceramics Exhibiting Morphotropic Phase Boundary (Year: 2005).*
(Continued)

*Primary Examiner* — Karl E Group
(74) *Attorney, Agent, or Firm* — Slater Matsil, LLP

(57) ABSTRACT

A dielectric composition, a dielectric element, an electronic component and a laminated electronic component are disclosed. In an embodiment the dielectric composition has a perovskite crystal structure containing at least Bi, Na, Sr and Ti, wherein the dielectric composition includes at least one selected from among La, Ce, Pr, Nd, Sm, Eu, Gd, Tb, Dy, Ho, Yb, Ba, Ca, Mg and Zn, wherein the dielectric composition includes specific particles having a core-shell structure that has at least one core portion including $SrTiO_3$, and (Continued)

wherein α<0.20, where α is the ratio of the number of specific particles with respect to the total number of particles contained in the dielectric composition.

14 Claims, 4 Drawing Sheets

(51) Int. Cl.
    *C04B 35/462*    (2006.01)
    *C04B 35/47*     (2006.01)
    *H01G 4/30*      (2006.01)
    *C04B 35/468*    (2006.01)
    *C04B 35/628*    (2006.01)

(52) U.S. Cl.
    CPC ............ *C04B 35/47* (2013.01); *C04B 35/475* (2013.01); *C04B 35/62821* (2013.01); *H01G 4/1227* (2013.01); *H01G 4/30* (2013.01); C04B 2235/3206 (2013.01); C04B 2235/3208 (2013.01); C04B 2235/3213 (2013.01); C04B 2235/3215 (2013.01); C04B 2235/3224 (2013.01); C04B 2235/3227 (2013.01); C04B 2235/3229 (2013.01); C04B 2235/3236 (2013.01); C04B 2235/3284 (2013.01); C04B 2235/3298 (2013.01); C04B 2235/5445 (2013.01); C04B 2235/768 (2013.01); C04B 2235/77 (2013.01); C04B 2235/80 (2013.01); C04B 2235/85 (2013.01)

(56) References Cited

U.S. PATENT DOCUMENTS

| | | | |
|---|---|---|---|
| 7,744,954 B2* | 6/2010 | Fujikawa | ............ C04B 35/4682 |
| | | | 427/212 |
| 8,043,987 B2 | 10/2011 | Chen et al. | |
| 8,593,038 B2 | 11/2013 | Kang et al. | |
| 9,105,407 B2* | 8/2015 | Morita | ...................... H01G 4/12 |
| 9,530,563 B2 | 12/2016 | Imura et al. | |
| 10,099,964 B2* | 10/2018 | Tauchi | .................. C04B 35/462 |
| 2006/0216512 A1 | 9/2006 | Fujikawa et al. | |
| 2014/0285950 A1 | 9/2014 | Morita et al. | |
| 2018/0211778 A1* | 7/2018 | Tauchi | .................. C04B 35/462 |
| 2018/0211780 A1* | 7/2018 | Hirose | .................. H01G 4/012 |

FOREIGN PATENT DOCUMENTS

| | | |
|---|---|---|
| JP | 2005022891 A | 1/2005 |
| JP | 2007161538 A | 6/2007 |
| JP | 2008520541 A | 6/2008 |
| JP | 2013136501 A | 7/2013 |
| JP | 2014189465 A | 10/2014 |

OTHER PUBLICATIONS

Vintila, R. et al., "Effect of A-Site Substitutions on the Microstructure and Dielectric Properties of Bismuth Sodium Titanate-Based Ceramics Exhibiting Morphotropic Phase Boundary," Advances in Electronic Ceramic Materials, vol. 26, No. 5, Jan. 23-28, 2005, 8 pages.

* cited by examiner

DIELECTRIC COMPOSITION, DIELECTRIC ELEMENT, ELECTRONIC COMPONENT AND LAMINATED ELECTRONIC COMPONENT

This patent application is a national phase filing under section 371 of PCT/EP2016/063859, filed Jun. 16, 2016, which claims the priority of Japanese patent application 2015-143358, filed Jul. 17, 2015, each of which is incorporated herein by reference in its entirety.

TECHNICAL FIELD

The present invention relates to a dielectric composition and a dielectric element comprising the same, and to an electronic component and a laminated electronic component; more specifically, the present invention relates to a dielectric composition, a dielectric element, an electronic component and a laminated electronic component which are used for applications with a relatively high rated voltage.

BACKGROUND

In recent years there has been an increasing demand for miniaturization of dielectric elements and improved reliability as electronic circuits reach higher densities, and electronic components such as laminated ceramic capacitors are rapidly becoming more compact, achieving higher capacity, and becoming more reliable while the applications thereof are also expanding. As these applications expand, various characteristics are required, such as temperature characteristics of capacitance in a laminated ceramic capacitor, effective capacitance during application of a DC electric field and reliability.

In order to respond to requirements such as those mentioned above, various types of dielectric compositions comprising $BaTiO_3$ (which has a high dielectric constant) as the main component have been investigated as dielectric compositions which are employed in ceramic capacitors. Among these, it is known that dielectric compositions having an auxiliary component diffused in the surface region of $BaTiO_3$ particles, referred to as dielectric compositions having a "core-shell" structure, can improve characteristics such as the temperature characteristics of dielectric constant, by controlling the composition and range of the shell portion which constitutes the auxiliary component diffusion phase.

For example, a laminated ceramic capacitor having the abovementioned features is described in Japanese Patent Application JP 2000-58377 A.

The laminated ceramic capacitor described in Japanese Patent Application JP 2000-58377 A has a main component in a dielectric ceramic layer represented by the following compositional formula: $\{Ba_{1-x}Ca_xO\}_m TiO_2 + \alpha Re_2O_3 + \beta MgO + \gamma MnO$ (where $Re_2O_3$ is at least one selected from among $Y_2O_3$, $Gd_2O_3$, $Tb_2O_3$, $Dy_2O_3$, $Ho_2O_3$, $Er_2O_3$ and $Yb_2O_3$; $\alpha$, $\beta$ and $\gamma$ express molar ratios such that $0.001 \leq \alpha \leq 0.10$, $0.001 \leq \beta \leq 0.12$ and $0.001 < \gamma \leq 0.12$; and $1.000 < m \leq 1.035$ and $0.005 < x \leq 0.22$). The content of alkali metal oxide in the $\{Ba_{1-x}Ca_xO\}_m TiO_2$ starting material used in the dielectric ceramic layer is no greater than 0.02 wt %.

The composition contains 0.2-5.0 parts by weight of either a first auxiliary component or a second auxiliary component with respect to boo parts by weight of the main component. The first auxiliary component is an oxide of $Li_2O$—$(Si,Ti)O_2$-MO (where MO is at least one selected from $Al_2O_3$ and $ZrO_2$). The second auxiliary component is an oxide of $SiO_2$—$TiO_2$—XO (where XO is at least one selected from among BaO, CaO, SrO, MgO, ZnO and MnO).

An internal electrode of the laminated ceramic capacitor described in Japanese Patent Application JP 2000-58377 A further comprises nickel or a nickel alloy.

The laminated ceramic capacitor described in Japanese Patent Application JP 2000-58377 A has a core-shell structure in which an auxiliary component is diffused in the region of the grain boundary, and has a core portion in which some of the $BaTiO_3$ constituting the main component of the dielectric ceramic layer is substituted with $CaTiO_3$, and as a result it is possible to restrict a reduction in the dielectric constant when a DC bias is applied and to adequately increase resistivity when a DC bias is applied.

However, in the laminated ceramic capacitor described in Japanese Patent Application JP 2000-58377 A, $BaTiO_3$ constituting the main component occupies the majority of the core portion, so a DC bias is unevenly applied. The dielectric constant of the laminated ceramic capacitor and the DC bias resistivity decrease when a DC bias of 5 kV/mm or greater is applied because the DC bias is unevenly applied.

SUMMARY OF THE INVENTION

Embodiments of the present invention provide a dielectric composition which can be used in a power supply circuit having a high rated voltage, wherein the dielectric composition has an excellent dielectric constant when a DC bias is applied, excellent DC bias characteristics and excellent DC bias resistivity. Embodiments of the present invention also provide a dielectric element comprising the dielectric composition, an electronic component and a laminated electronic component.

Various embodiments of the present invention relate to a dielectric composition having a perovskite crystal structure containing at least Bi, Na, Sr and Ti, wherein: the dielectric composition comprises at least one selected from among La, Ce, Pr, Nd, Sm, Eu, Gd, Tb, Dy, Ho, Yb, Ba, Ca, Mg and Zn; the dielectric composition comprises specific particles having a core-shell structure that has at least one core portion including $SrTiO_3$; and $\alpha < 0.20$, where $\alpha$ is the ratio of the number of specific particles with respect to the total number of particles contained in the dielectric composition.

By setting $\alpha < 0.20$, where $\alpha$ is the ratio of the number of specific particles with respect to the total number of particles contained in the dielectric composition, it is possible to improve the dielectric constant when a DC bias is applied, and also to improve the DC bias characteristics and DC bias resistivity.

Furthermore, the content of at least one selected from among La, Ce, Pr, Nd, Sm, Eu, Gd, Tb, Dy, Ho, Yb, Ba, Ca, Mg and Zn is preferably between 0.5 and 15 molar parts, taking the Ti content of the dielectric composition as 100 molar parts. This makes it possible to further improve the dielectric constant when a DC bias is applied, and the DC bias characteristics.

In addition, preferably, $0.20 \leq \beta \leq 0.86$, where $\beta$ is the molar ratio of Sr with respect to Na in the dielectric composition. This makes it possible to further improve the dielectric constant when a DC bias is applied, and the DC bias characteristics.

A dielectric element according to embodiments of the present invention is provided with the abovementioned dielectric composition.

An electronic component according to embodiments of the present invention is provided with a dielectric layer comprising the abovementioned dielectric composition.

A laminated electronic component according to embodiments of the present invention has a laminated portion formed by alternately laminating an internal electrode layer and a dielectric layer comprising the abovementioned dielectric composition.

Preferred embodiments of the present invention will be described below with reference to the figures. It should be noted that the present invention is not limited to the following modes of embodiment. Furthermore, the constituent elements described below include elements which can be readily envisaged by a person skilled in the art and also elements which are substantially the same. In addition, the constituent elements described below may be combined, as appropriate.

DETAILED DESCRIPTION OF ILLUSTRATIVE EMBODIMENTS

Figure 1:
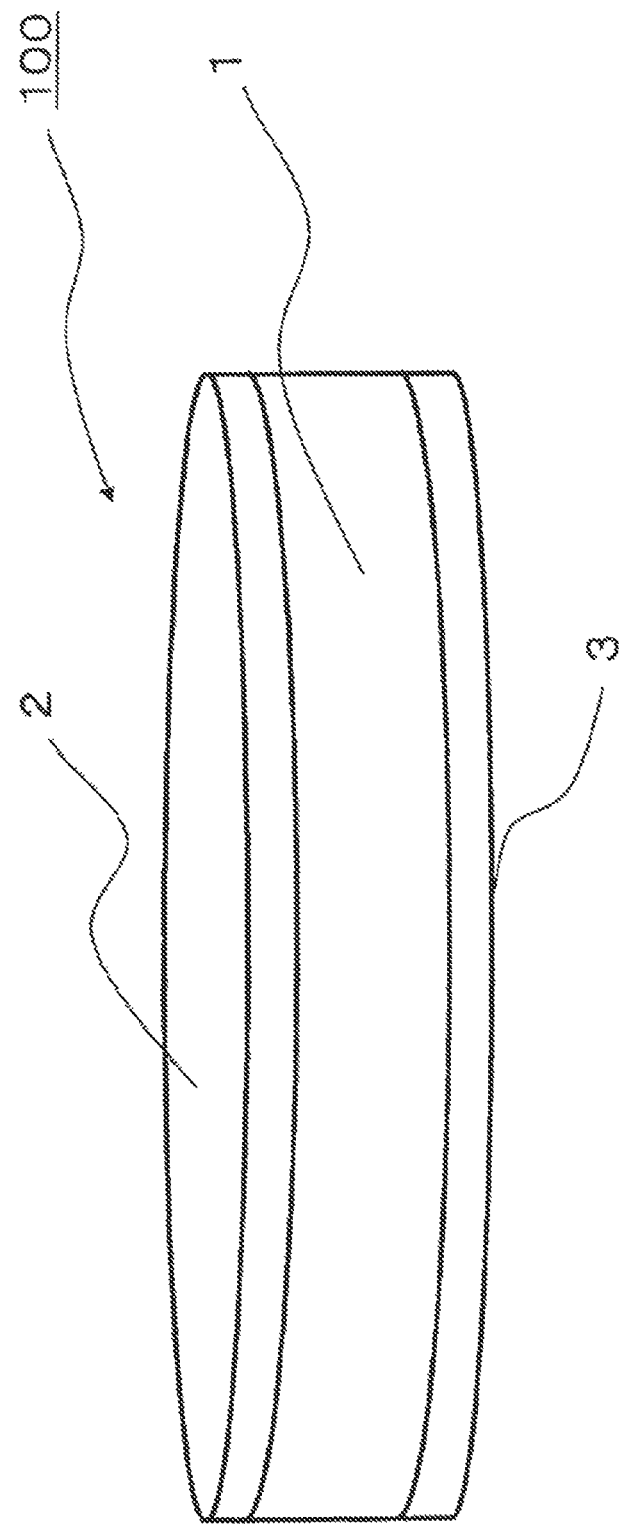
FIG. 1 is a schematic diagram of a ceramic capacitor according to an embodiment of the present invention.

FIG. 1 is a schematic diagram of a single-layer ceramic capacitor according to an embodiment of the present invention.

As shown in FIG. 1, a single-layer ceramic capacitor 100 according to an embodiment of the present invention comprises a disc-shaped dielectric body 1 and a pair of electrodes 2, 3. The single-layer ceramic capacitor 100 is obtained by forming the electrodes 2, 3 on both surfaces of the dielectric body 1. There is no particular limitation as to the shapes of the dielectric body 1 and the electrodes 2, 3. Furthermore, there is no particular limitation as to the dimensions thereof either, and suitable dimensions should be set in accordance with the application.

The dielectric body 1 comprises a dielectric composition according to this embodiment. There is no particular limitation as to the material of the electrodes 2, 3. For example, Ag, Au, Cu, Pt, Ni or the like may be used, but other metals may also be used.

Figure 2:
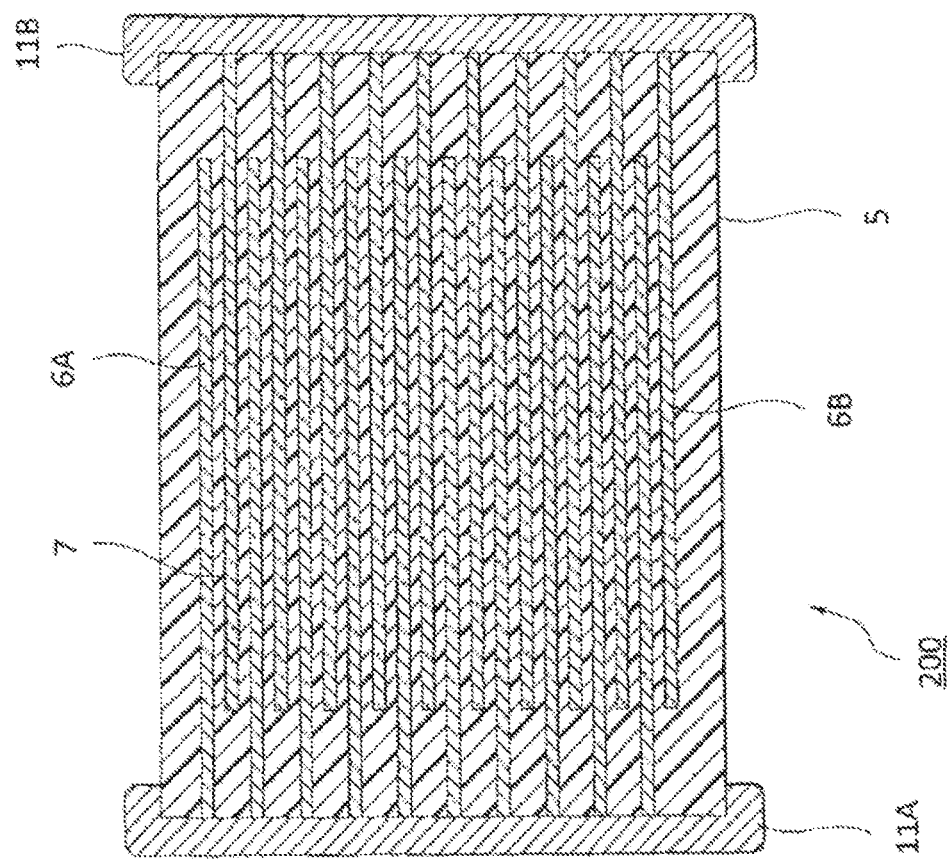
FIG. 2 is a view in cross section of a laminated ceramic capacitor according to a different embodiment of the present invention.

FIG. 2 is a schematic cross-sectional diagram of a laminated ceramic capacitor according to a different embodiment of the present invention.

As shown in FIG. 2, a laminated ceramic capacitor 200 according to a different embodiment of the present invention comprises a capacitor element main body 5 having a structure in which dielectric layers 7 and internal electrode layers 6A, 6B are alternately stacked. A pair of terminal electrodes 11A, 11B which conduct, respectively, with the internal electrode layers 6A, 6B alternately arranged inside the element main body 5 are formed at both ends of the element main body 5. There is no particular limitation as to the shape of the element main body 5, but it is normally a cuboid shape. Furthermore, there is no particular limitation as to the dimensions thereof, and suitable dimensions should be set in accordance with the application.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

There is no particular limitation as to the material of the internal electrode layers 6A, 6B. For example, a metal such as Au, Pt, Ag, Ag—Pd alloy, Cu or Ni etc. may be used, but it is also possible to use other metals.

The terminal electrodes 11A, 11B are provided at the end surfaces of the laminated body 5 in contact with the ends of the internal electrode layers 6A, 6B which are exposed at said end surfaces. By virtue of this structure, the terminal electrodes 11A, 11B are electrically connected to the internal electrode layers 6A, 6B, respectively. The terminal electrodes 11A, 11B may comprise a conductive material having Ag, Au, Cu or the like as the main component thereof. There is no particular limitation as to the thickness of the terminal electrodes 11A, 11B. The thickness thereof is appropriately set in accordance with the application and the size of the laminated dielectric element, among other things. The thickness of the terminal electrodes 11A, 11B may be set at 10-50 µm, for example.

The dielectric layers 7 comprise the dielectric composition according to this embodiment. The thickness of each dielectric layer 7 may be freely set and there is no particular limitation. The thickness may be set at 1-100 µm, for example.

Here, the dielectric composition according to this embodiment has a perovskite crystal structure containing at least Bi, Na, Sr and Ti, and comprises at least one selected from among La, Ce, Pr, Nd, Sm, Eu, Gd, Tb, Dy, Ho, Yb, Ba, Ca, Mg and Zn (also referred to below as an "auxiliary component").

The dielectric composition having a perovskite crystal structure is a polycrystalline material comprising, as the main phase, a perovskite compound represented by the general formula $ABO_3$, where A includes at least one selected from Bi, Na and Sr, and B includes at least Ti.

If the whole of A is taken as 100 at. %, the proportion of Bi, Na, Sr contained in A is preferably a total of at least 80 at. %. Furthermore, if the whole of B is taken as 100 at. %, the proportion of Ti contained in B is preferably at least 80 at. %.

Figure 3:
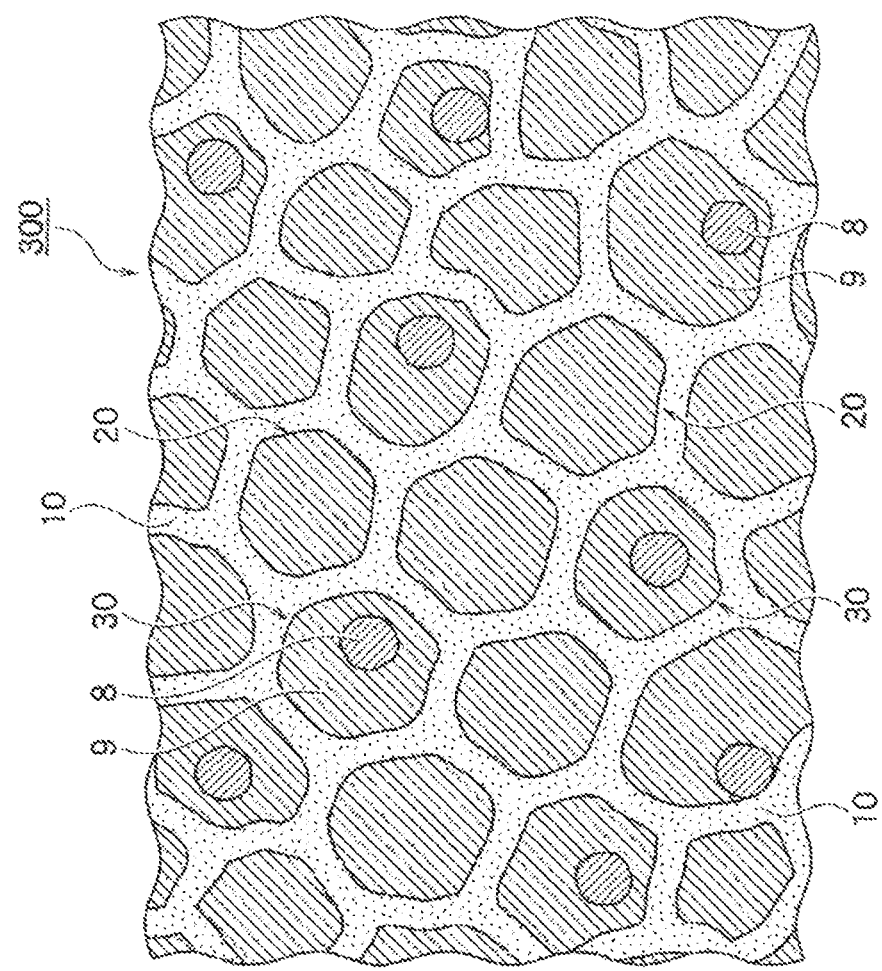
FIG. 3 is a schematic diagram of a dielectric composition according to an embodiment of the present invention.

FIG. 3 is a schematic diagram of particles in a dielectric composition 300 according to this embodiment. The dielectric composition 300 according to this embodiment comprises single-phase particles 20 which do not have a core-shell structure, and core-shell particles 30 which have a core-shell structure.

A grain boundary 10 is present between particles. The core-shell particles comprise a shell portion 9 surrounding a core portion 8, and there are forms of particles in which the core portion 8 is completely contained within the shell portion 9, and in which part of the core portion 8 is in contact with the grain boundary 10 while another part of the core portion 8 is contained within the shell portion 9.

In addition, the majority of the core-shell particles 30 in the dielectric composition 300 according to this embodiment are specific particles having a core-shell structure that has at least one core portion including $SrTiO_3$.

The core portion including $SrTiO_3$ has a $SrTiO_3$ crystal structure and contains at least 40 at. % of each of Sr atoms and Ti atoms, where the total of the metal particles contained in the core portion is taken as 100 at. %.

Here, the shell portion 9 of the specific particles preferably contains at least Na, Bi and Ti.

A method for determining whether or not particles contained in the dielectric composition 300 according to this embodiment are specific particles, and a method for calculating the ratio $\alpha$ of the number of specific particles with respect to the total number of particles contained in the dielectric composition 300 will be described below.

There is no particular limitation as to the method for distinguishing whether or not said particles are core-shell particles 30. In addition, there is no particular limitation as to the method for determining whether or not the core portion 8 of the core-shell particles 30 includes $SrTiO_3$. For example, it is possible to distinguish whether said particles are single-phase particles 20 or core-shell particles 30 by subjecting a cross section cut on any plane of the dielectric composition 300 to scanning transmission electron microscopy (STEM) and energy dispersive X-ray spectroscopy (EDS), and confirming the element distribution. In addition, it is also possible to determine whether or not the core portion 8 of the core-shell particles 30 includes $SrTiO_3$.

There is no particular limitation as to the method for setting the observation field for STEM and EDS, but the size of the observation field is preferably at least 2 µm×at least 2 µm, and the magnification of the observation field is preferably between 10 000 times and 100 000 times.

A plurality of particles which can be confirmed as being completely surrounded by the grain boundary 10 are selected from the observation field, and the number of core-shell particles among these having a core portion including $SrTiO_3$ (specific particles) is counted. It is possible to calculate the value of $\alpha$ by dividing the number of specific particles by the number of selected particles. It should be noted that at least 20 particles are selected and preferably at least 100 particles are selected. Furthermore, the number of particles selected may be increased by setting a plurality of observation fields.

It should be noted that the amount of core-shell particles 30 produced may be controlled, as appropriate, by varying the make-up of the dielectric composition and the method for producing same, and also by varying the baking conditions when the dielectric composition is baked. For example, when a starting material powder having a large particle size is used, core-shell particles 30 tend to be readily produced. Furthermore, when the baking temperature is increased, core-shell particles 30 tend to be unlikely to be produced.

The dielectric composition 300 according to this embodiment may equally include particles other than the specific particles and the single-phase particles 20, i.e., it may include core-shell particles other than the specific particles. Here, the ratio of the total number of specific particles and single-phase particles 20 with respect to the total number of particles contained in the dielectric composition 300 according to embodiments of the present invention is preferably 80% or greater.

According to this embodiment, the ratio $\alpha$ of the number of specific particles with respect to the total number of particles contained in the dielectric composition 300 satisfies $\alpha<0.20$.

It should be noted that $\alpha$ may equally be 0. That is to say, the dielectric composition 300 according to this embodiment need not contain the abovementioned specific particles.

As a result of setting $\alpha<0.20$ in the dielectric composition 300 according to this embodiment, the resistivity is unlikely to decrease even if a high DC bias is applied. This means that it is possible to simultaneously achieve a high dielectric constant, high DC bias resistivity and good DC bias characteristics when a high DC bias is applied to the dielectric composition 300 according to this embodiment.

On the other hand, if the ratio $\alpha$ of the number of specific particles with respect to the total number of particles is such that $\alpha \geq 0.20$, there is likely to be a reduction in the DC bias resistivity.

The reason for which a reduction in the DC bias resistivity is likely to occur if $\alpha \geq 0.20$ is unclear, but the present inventors believe the reason to be as follows. When a DC bias is applied to a dielectric composition containing an excessive amount of specific particles, i.e., a dielectric composition for which $\alpha \geq 0.20$, the manner in which the DC bias is applied becomes uneven within the dielectric composition. The DC bias resistivity is likely to decrease as a result of the DC bias being unevenly applied.

The dielectric composition 300 according to this embodiment is preferably such that $\alpha$ satisfies $0.05 \leq \alpha < 0.20$. When $0.05 \leq \alpha < 0.20$, it is possible to further improve the dielectric constant when a DC bias is applied. $\alpha$ more preferably satisfies $0.05 \leq \alpha \leq 0.19$.

The dielectric composition 300 according to this embodiment is preferably such that $0.20 \leq \beta \leq 0.86$, where $\beta$ is the molar ratio of Sr with respect to Na in the dielectric composition. The dielectric composition exhibits antiferroelectric properties when $0.20 \leq \beta \leq 0.86$, and therefore it is possible to further improve the dielectric constant when a DC bias is applied, and also the DC bias characteristics.

Furthermore, there is no particular limitation as to the content of the auxiliary component, but an auxiliary component must be included. If an auxiliary component is not included, there is deterioration in the dielectric constant when a DC bias is applied and in the DC bias characteristics.

Furthermore, the content of the auxiliary component is preferably a total of between 0.5 molar parts and 15 molar parts when the Ti content of the dielectric composition is taken as 100 molar parts. By setting the content of the auxiliary component in this range, it is possible to further increase the dielectric constant when a DC bias is applied. It should be noted that the auxiliary component may be present in the single-phase particles 20, the core portion 8 of the core-shell particles 30, the shell portion 9 of the core-shell particles 30, or the grain boundary 10.

In light of the above, the dielectric composition according to this embodiment has as an excellent dielectric constant when a DC bias is applied, excellent DC bias characteristics and excellent DC bias resistivity overall.

An example of a method for producing the ceramic capacitor 100 shown in FIG. 1 will be described next.

First of all, it is possible to use an oxide of a metal element forming part of the dielectric composition, or a mixture thereof or a composite oxide as the starting material of the dielectric body 1, but the dielectric starting material may also be appropriately selected from various types of compounds which form the abovementioned oxides or composite oxides as a result of baking, e.g., carbonates, oxalates, nitrates, hydroxides and organometallic compounds etc. and these may be mixed for use.

For example, the following powders may be cited as starting materials: bismuth oxide ($Bi_2O_3$), sodium carbonate ($Na_2CO_3$), strontium carbonate ($SrCO_3$), barium carbonate ($BaCO_3$), calcium carbonate ($CaCO_3$), lanthanum hydroxide ($La(OH)_3$) and titanium oxide ($TiO_2$), among others.

Furthermore, there is no particular limitation as to the particle size of the unprocessed starting material powder (referred to below as the "starting material powder"), but a particle size of 0.1 μm-1 μm is preferred. Furthermore, the mean particle size of the starting material may be adjusted by appropriately varying the time for which the starting material is mixed.

Here, the fineness of the starting material powder is affected by the magnitude of α. The smaller the particle size of the starting material powder, the lower α tends to be.

The abovementioned starting material powders are weighed out in such a way that the dielectric compositions after baking (sintered compacts) satisfy the make-up of the dielectric composition according to this embodiment.

The weighed starting material powders are then wet-mixed using a ball mill or the like. The mixtures obtained by wet mixing are then calcined to produce calcined material. Here, the calcining is carried out under normal air. Furthermore, the calcining temperature is preferably 700-900° C. and the calcining time is preferably 1-10 hours.

The resulting calcined material is then wet-ground using a ball mill or the like, after which it is dried to obtain calcined powders. A binder is then added to the resulting calcined powder and the material is press-moulded to obtain a moulded article. There is no particular limitation as to the binder which can be used, provided that it is a binder which is conventionally used in this technical field. Polyvinyl alcohol (PVA) or the like may be cited as a specific example of a binder. There is no particular limitation as to the amount of binder added, but an amount of 1-5 wt % is preferably added when the calcined powder is taken as 100 wt %. There is no particular limitation as to the moulding pressure during press-moulding, but a pressure of the order of 300 MPa is preferred. There is no particular limitation as to the shape of the moulded article. A disc-shape is employed in this embodiment, but a cuboid or other shape is equally feasible.

The dielectric body 1 is obtained by baking the resulting moulded article. The baking is normally carried out under the air. Furthermore, the baking temperature is preferably 950-1400° C. and the baking time is preferably 2-10 hours.

Here, it is possible to vary the value of α by appropriately selecting the baking conditions. The higher the baking temperature, the lower the value of α tends to be. Furthermore, the longer the baking time, the lower the value of α tends to be.

The electrodes 2, 3 are then formed on both surfaces of the resulting dielectric body 1. There is no particular limitation as to the material of the electrodes, and Ag, Au, Cu, Pt, Ni or the like may be used. The method for forming the electrodes involves vapour deposition, sputtering, printing, electroless plating or the like, but a method other than these may be used and there is no particular limitation as to the method for forming the electrodes. The ceramic capacitor 100 shown in FIG. 1 may be produced by the method described above.

Furthermore, the laminated ceramic capacitor 200 shown in FIG. 2 may be produced by a conventional method for producing a laminated ceramic capacitor.

A description has been given above of the single-layer ceramic capacitor 100 and the laminated ceramic capacitor 200 according to this embodiment. The dielectric composition according to this embodiment has high capacitance and a high dielectric constant when a high DC bias is applied, and also has high resistivity, and therefore the dielectric composition can be advantageously used in medium- or high-voltage capacitors.

Furthermore, the present invention is not limited to the abovementioned embodiments. For example, the dielectric layer comprising the dielectric composition according to embodiments of the present invention may also be used as a dielectric element or the like for a semiconductor device. Furthermore, a conventional configuration may be freely used, apart from the make-up of the dielectric composition. Furthermore, the calcined powder may be produced by means of a known method such as hydrothermal synthesis when the ceramic capacitor is produced.

The dielectric element, electronic component and laminated electronic component according to embodiments of the present invention are advantageously used in a location where a relatively high rated voltage is applied. For example, they may be advantageously used in a power supply circuit having a high rated voltage, such as a DC-DC converter or an AC-DC inverter, etc.

Embodiments of the present invention makes it possible to provide a dielectric composition simultaneously having a dielectric constant of 1000 or greater when a DC bias of 6 kV/mm is applied, for example, DC bias characteristics of between −5% and 15%, and DC bias resistivity of $10^{13}$ Ωcm or greater, and also to provide a dielectric element employing said dielectric composition, an electronic component and a laminated electronic component.

In addition, the dielectric element, electronic component and laminated electronic component according to embodiments of the present invention are also of use in a smoothing capacitor or a snubber capacitor for circuit protection for which there is a need for a high dielectric constant when a high DC bias is applied.

In addition, the dielectric composition according to embodiments of the present invention does not contain lead. The inventive dielectric composition, dielectric element, electronic component and laminated electronic component are therefore also superior from an environmental point of view.

Embodiments of the present invention will be described below in further detail with the aid of exemplary embodiments and comparative examples. However, the present invention is not limited by the following exemplary embodiments.

Exemplary Embodiments 1-19 and Comparative Examples 1-5

The following powders were prepared as starting material powders: bismuth oxide ($Bi_2O_3$), sodium carbonate ($Na_2CO_3$), strontium carbonate ($SrCO_3$), barium carbonate ($BaCO_3$), calcium carbonate ($CaCO_3$), magnesium carbonate ($MgCO_3$), zinc oxide (ZnO), lanthanum hydroxide ($La(OH)_3$), neodymium oxide ($Nd_2O_3$), samarium oxide ($Sm_2O_3$), gadolinium oxide ($Gd_2O_3$) and titanium oxide ($TiO_2$). Here, the mean particle size of each starting material powder was appropriately adjusted in the range of 0.1 μm-1 μm and α in the dielectric composition samples had the values shown in table 1.

The abovementioned starting material powders were weighed out in such a way that the baked dielectric composition contained Sr, Na, Bi and Ti, the molar ratio β of Sr with respect to Na had the values shown in table 1, auxiliary components of the type and amounts shown in table 1 were contained therein, and the baked dielectric composition had a perovskite crystal structure.

The weighed starting material powders were wet-mixed by means of a ball mill to obtain mixtures. The resulting mixtures were calcined for 2 hours under the air at 850° C. to obtain calcined material. The calcined material was then wet-ground using a ball mill to obtain calcined powders. 1 wt % of polyvinyl alcohol (PVA) was then added with respect to 100 wt % of the calcined powders. The calcined powders to which PVA had been added were then moulded under a pressure of about $5\times10^2$ MPa and disc-shaped moulded articles having a planar diameter dimension of around 17 mm and a thickness of around 1 mm were obtained.

The disc-shaped moulded articles were then baked to obtain dielectric composition samples. The baking conditions during this baking were as follows: the baking was performed under the air, the baking temperature was appropriately adjusted in the range of 950-1400° C., and the baking time was appropriately adjusted in the range of 2-10 hours, α in the dielectric composition samples had the values shown in table 1, and the relative density of the dielectric composition samples was 95% or greater.

When the density of the dielectric composition samples was measured, it was found that the density of the dielectric composition samples in all of the exemplary embodiments and comparative examples was 95% or greater with respect to the theoretical density. That is to say, the relative density of the dielectric composition samples was 95% or greater in all of the exemplary embodiments and comparative examples.

The crystal structure of the dielectric composition samples was measured and analysed by means of X-ray diffraction. It was confirmed as a result that the dielectric composition samples in all of the exemplary embodiments and comparative examples comprised a perovskite crystal compound.

The make-up of the dielectric composition samples was analysed by means of X-ray fluorescence analysis. It was confirmed as a result that the contents of auxiliary components were the values shown in table 1, taking the contents of β and Ti in each sample as 100 molar parts.

The dielectric composition samples were formed into thin sheets by means of polishing, and lastly observation locations were cut into flakes by means of a gallium ion beam. The observation locations were then observed by means of scanning transmission electron microscopy (STEM). In addition, energy dispersive X-ray spectroscopy (EDS) was performed in the same observation field, and the element distribution was confirmed. The size of the observation field in STEM and EDS was 5 μm×5 μm and the magnification of the observation field was 40 000 times. Furthermore, a plurality of observation fields was set.

100 particles which could be confirmed as being completely surrounded by the grain boundary were selected from the plurality of observation fields. The number of core-shell particles among these having at least one core portion including $SrTiO_3$ (specific particles) was counted, the ratio α of the specific particles was calculated by means of the following formula (1), and it was confirmed that the value of α for each sample was the value in table 1.

$$\alpha = (\text{number of specific particles})/100 \qquad \text{Formula (1)}$$

Ag electrodes were vapour-deposited on both surfaces of the dielectric composition samples to produce capacitor samples. The dielectric constant ε1, the dielectric constant ε2 and the DC bias resistivity $\rho_{DC}$ indicated below were measured for the capacitor samples. The DC bias characteristics were further calculated from ε1 and ε2.

The dielectric constant ε1 (no units) was calculated from the capacitance measured from conditions of room temperature at 25° C., frequency 1 kHz, and input signal level (measurement voltage) 1.0 Vrms using a digital LCR meter (Hewlett-Packard; 4284A).

The dielectric constant ε2 (no units) was calculated from the capacitance measured from conditions of room temperature at 25° C., frequency 1 kHz, and input signal level (measurement voltage) 1.0 Vrms, surface area of facing electrodes, and interlayer distance while a DC bias generator (GLASSMAN HIGH VOLTAGE; WX10P90) was connected to a digital LCR meter (Hewlett-Packard; 4284A) and a DC bias of 6 kV/mm was applied to the samples for evaluation. A value of 1000 or greater for the dielectric constant ε2 was deemed to be good in the present exemplary embodiments.

The DC bias characteristics were calculated by means of the following formula (2) from the dielectric constant ε1 and the dielectric constant ε2. In the exemplary embodiments, a DC bias of between −5% to 15% was deemed to be good.

$$\text{DC bias characteristics (\%)} = 100 \times (\varepsilon 2 - \varepsilon 1)/\varepsilon 1 \qquad \text{Formula (2)}$$

The DC bias resistivity $\rho_{DC}$ was calculated from the insulation resistance when a DC bias of 6 kV/mm was applied for 1 minute using a digital ultra-high resistance meter (ADVANTEST; R8340A). A higher value for the DC bias resistivity $\rho_{DC}$ was preferred. A value of $10^{13}$ Ωcm or greater was deemed to be good in the present exemplary embodiments.

The dielectric constant ε1, the dielectric constant ε2, the DC bias characteristics, and the DC bias resistivity $\rho_{DC}$ in the exemplary embodiments and comparative examples are shown in table 1. A capacitor sample exhibiting a dielectric constant ε2 of 1000 or greater, DC bias characteristics of between −5% and 15%, and DC bias resistivity $\rho_{DC}$ of $10^{13}$ Ωcm or greater was deemed to be good.

It should be noted that the values in table 1 for the DC bias resistivity $\rho_{DC}$ column are indexed; e.g., $1.0\times10^{13}$ Ωcm is denoted as 1.0E+13.

TABLE 1

| Sample no. | Core-shell particle ratio α | Auxiliary component Type | Amount (molar parts) | Molar ratio β of Sr with respect to Na | Dielectric constant ε1 | Dielectric constant ε2 | DC bias characteristics (%) (ε2 − ε1)/ε1 | DC bias resistivity ρDC (Ωcm) |
|---|---|---|---|---|---|---|---|---|
| Exemplary Embodiment 1 | 0.10 | La | 3.3 | 0.50 | 1783 | 1978 | 10.9 | 1.4.E+13 |
| Exemplary Embodiment 2 | 0.01 | La | 6.7 | 0.12 | 1225 | 1211 | −1.1 | 2.3.E+13 |
| Exemplary Embodiment 2a | 0.01 | La | 6.7 | 0.50 | 1501 | 1585 | 5.6 | 2.0.E+13 |
| Exemplary Embodiment 3 | 0.04 | La | 0.5 | 0.20 | 1623 | 1606 | −1.0 | 1.9.E+13 |
| Exemplary Embodiment 4 | 0.09 | La | 6.7 | 0.22 | 1395 | 1412 | 1.2 | 1.6.E+13 |
| Exemplary Embodiment 5 | 0.09 | La | 6.7 | 0.50 | 1501 | 1631 | 8.7 | 1.8.E+13 |
| Exemplary Embodiment 6 | 0.18 | La | 15.0 | 0.67 | 1475 | 1522 | 3.2 | 1.9.E+13 |

TABLE 1-continued

| Sample no. | Core-shell particle ratio α | Auxiliary component Type | Amount (molar parts) | Molar ratio β of Sr with respect to Na | Dielectric constant ε1 | Dielectric constant ε2 | DC bias characteristics (%) (ε2 − ε1)/ε1 | DC bias resistivity ρDC (Ωcm) |
|---|---|---|---|---|---|---|---|---|
| Exemplary Embodiment 7 | 0.19 | La | 3.3 | 0.71 | 2334 | 2260 | −3.2 | 1.1.E+13 |
| Exemplary Embodiment 8 | 0.17 | La | 3.3 | 0.86 | 2263 | 2207 | −2.5 | 1.1.E+13 |
| Exemplary Embodiment 9 | 0.11 | Mg | 2.5 | 0.50 | 1698 | 1725 | 1.6 | 1.3.E+13 |
| Exemplary Embodiment 10 | 0.11 | Zn | 2.5 | 0.50 | 1654 | 1685 | 1.9 | 1.5.E+13 |
| Exemplary Embodiment 11 | 0.13 | Ba | 5.0 | 0.50 | 1849 | 1872 | 1.2 | 1.9.E+13 |
| Exemplary Embodiment 12 | 0.13 | Ca | 5.0 | 0.50 | 1666 | 1693 | 1.6 | 1.3.E+13 |
| Exemplary Embodiment 13 | 0.13 | Gd | 3.3 | 0.50 | 1772 | 1799 | 1.5 | 1.5.E+13 |
| Exemplary Embodiment 14 | 0.14 | Nd | 3.3 | 0.50 | 1756 | 1812 | 3.2 | 1.8.E+13 |
| Exemplary Embodiment 15 | 0.14 | Sm | 3.3 | 0.50 | 1761 | 1748 | −0.7 | 1.8.E+13 |
| Exemplary Embodiment 16 | 0.15 | La | 20.0 | 0.50 | 1184 | 1179 | −0.4 | 1.5.E+13 |
| Exemplary Embodiment 17 | 0.15 | La | 0.1 | 0.22 | 1215 | 1157 | −4.8 | 1.4.E+13 |
| Exemplary Embodiment 18 | 0.19 | La | 10.0 | 0.89 | 1238 | 1302 | 5.2 | 1.1.E+13 |
| Exemplary Embodiment 19 | 0.18 | None | 18.9 | 0.87 | 1171 | 1168 | −0.3 | 1.2.E+13 |
| Comparative Example 1 | 0.15 | None | *0.0* | 0.50 | 1766 | *719* | *−59.3* | 1.3.E+13 |
| Comparative Example 2 | *0.24* | None | 3.3 | 0.92 | 2263 | 1984 | *−12.3* | *4.2.E+12* |
| Comparative Example 3 | *0.48* | Mg | 2.5 | 2.00 | 2374 | 2211 | *−6.9* | *2.4.E+11* |
| Comparative Example 4 | *0.53* | Zn | 2.5 | 2.50 | 2118 | 2200 | 3.9 | *6.3.E+11* |

It can be seen from table 1 that the capacitor samples according to Exemplary Embodiments 1-19 in which the ratio α of specific particles was such that α<0.20 exhibited a dielectric constant ε2 of 1000 or greater, DC bias characteristics of between −5% and 15%, and DC bias resistivity $\rho_{DC}$ of $10^{13}$ Ωcm or greater.

Furthermore, the capacitor samples according to Exemplary Embodiments 1-15 and 18 in which the auxiliary component content was between 0.5 molar parts and 15 molar parts exhibited a dielectric constant ε2 of 1200 or greater, DC bias characteristics of between −5% and 15%, and DC bias resistivity $\rho_{DC}$ of $10^{13}$ Ωcm or greater.

In addition, the capacitor samples according to Exemplary Embodiments 1, 2a and 3-15 in which the auxiliary component content was between 0.5 molar parts and 15 molar parts and the molar ratio of Sr with respect to Na satisfied 0.20≤β≤0.86 exhibited a dielectric constant ε2 of 1400 or greater, DC bias characteristics of between −5% and 15%, and DC bias resistivity $\rho_{DC}$ of $10^{13}$ Ωcm or greater.

In contrast to this, the capacitor samples according to Comparative Example 1 which did not contain the auxiliary component and Comparative Examples 2-4 in which the ratio α of core-shell particles was such that α≥0.20 exhibited results such that any of the dielectric constant ε2, the DC bias characteristics and the DC bias resistivity $\rho_{DC}$ were unfavourable.

In addition, the dielectric constant of the capacitor sample according to Exemplary Embodiment 1 was measured while the applied DC bias was varied in the range of 0-8 kV/mm. The measurement results are shown in FIG. 4 together with an outline of the change in dielectric constant of a conventional BaTiO₃-based capacitor sample.

Figure 4:
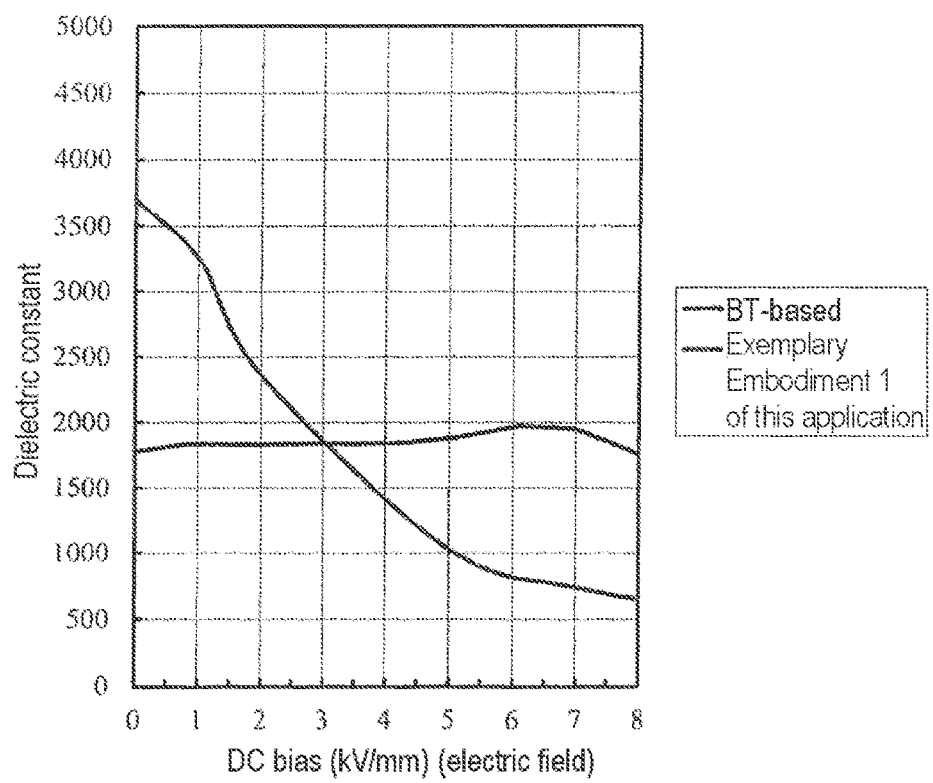
FIG. 4 is a graph schematically showing both a DC bias characteristics graph in accordance with Exemplary Embodiment 1 of the present invention, and a DC bias characteristics graph of a conventional $BaTiO_3$-based dielectric composition.

It is clear from FIG. 4 that the dielectric constant sharply dropped as the DC bias applied increased in the case of the conventional BaTiO₃-based capacitor sample, whereas a high dielectric constant was maintained in the capacitor sample having the dielectric composition according to embodiments of the invention even when the DC bias increased.

The invention claimed is:

1. A dielectric composition comprising:
   a perovskite crystal structure containing at least Bi, Na, Sr and Ti;
   at least one element selected from the group consisting of La, Ce, Pr, Nd, Sm, Eu, Gd, Tb, Dy, Ho, Yb, Ba, Ca, Mg and Zn;
   single phase particles which do not have a core-shell structure; and
   specific particles having a core-shell structure that has at least one core portion including SrTiO₃,
   wherein 0<α<0.20, where α is a ratio of a number of specific particles with respect to a total number of particles contained in the dielectric composition.

2. The dielectric composition according to claim 1, wherein a content of the at least one element selected from the group consisting of La, Ce, Pr, Nd, Sm, Eu, Gd, Tb, Dy, Ho, Yb, Ba, Ca, Mg and Zn is between 0.5 and 15 molar parts, taking a Ti content of the dielectric composition as 100 molar parts.

3. The dielectric composition according to claim 1, wherein 0.20≤β≤0.86, and wherein β is a molar ratio of Sr with respect to Na in the dielectric composition.

4. A dielectric element comprising the dielectric composition according to claim 1.

5. An electronic component comprising:
   a dielectric layer comprising the dielectric composition according to claim 1.

6. A laminated electronic component comprising:
   a laminated portion formed by alternately laminating an internal electrode layer and a dielectric layer comprising the dielectric composition according to claim 1.

7. A single-layer ceramic capacitor comprising:
   a disc-shaped dielectric body comprising the dielectric composition according to claim 1; and
   a pair of electrodes, wherein the electrodes are located on both surfaces of the dielectric body.

8. The single-layer ceramic capacitor according to claim 7, wherein a material of the electrodes comprises Cu.

9. A laminated ceramic capacitor comprising:
   a capacitor element main body having a structure in which dielectric layers comprising the dielectric composition according to claim 1 and internal electrode layers are alternately stacked; and
   a pair of terminal electrodes which are respectively conductively connected with the internal electrode layers alternately arranged inside the main body and which are located at both ends of the main body.

10. The laminated ceramic capacitor according to claim 9, wherein a material of the internal electrode layers comprises Cu.

11. The laminated ceramic capacitor according to claim 9, wherein the terminal electrodes comprise a conductive material having Cu as a main component thereof.

12. A method for producing a ceramic capacitor, the method comprising:
providing a dielectric composition for a dielectric layer of the capacitor by:
providing starting material powders of bismuth oxide ($Bi_2O_3$), sodium carbonate ($Na_2CO_3$), strontium carbonate ($SrCO_3$), barium carbonate ($BaCO_3$), calcium carbonate ($CaCO_3$) and lanthanum hydroxide (La($OH)_3$), wherein the starting material powders are weighed out such that a dielectric body has a perovskite crystal structure containing at least Bi, Na, Sr and Ti,
wherein the dielectric composition comprises,
wherein the dielectric composition comprises single phase particles which do not have a core-shell structure and specific particles having a core-shell structure that has at least one core portion including $SrTiO_3$, and
wherein $0<\alpha<0.20$, where $\alpha$ is a ratio of a number of specific particles with respect to a total number of particles contained in the dielectric composition;
wet-mixing the weighed starting material powders;
obtaining a calcined article by calcining a mixture obtained by wet-mixing;
wet-grounding the calcined article;
drying the calcined article to obtain a calcined powder;
adding a binder to the calcined powder;
press-moulding the calcined powder to obtain a moulded article;
baking the moulded article thereby obtaining the dielectric body; and
forming electrodes on both surfaces of the dielectric body.

13. The method according to claim 12, wherein a material of the electrodes comprises Ag, Au, Cu, Pt or Ni.

14. A method for producing a ceramic capacitor, the method comprising:
providing a dielectric composition for a dielectric layer of the capacitor by:
providing starting material powders of bismuth oxide ($Bi_2O_3$), sodium carbonate ($Na_2CO_3$), strontium carbonate ($SrCO_3$), barium carbonate ($BaCO_3$) and calcium carbonate ($CaCO_3$) wherein the starting material powders are weighed out such that a dielectric body has a perovskite crystal structure containing at least Bi, Na, Sr and Ti,
wherein the dielectric composition comprises at least one element selected from the group consisting of Ce, Pr, Nd, Sm, Eu, Gd, Tb, Dy, Ho, Yb, Ba, Ca, Mg and Zn,
wherein the dielectric composition comprises single phase particles which do not have a core-shell structure and specific particles having a core-shell structure that has at least one core portion including $SrTiO_3$, and
wherein $0<\alpha<0.20$, where $\alpha$ is a ratio of a number of specific particles with respect to a total number of particles contained in the dielectric composition;
wet-mixing the weighed starting material powders;
obtaining a calcined article by calcining a mixture obtained by wet-mixing;
wet-grounding the calcined article;
drying the calcined article to obtain a calcined powder;
adding a binder to the calcined powder;
press-moulding the calcined powder to obtain a moulded article;
baking the moulded article thereby obtaining the dielectric body; and
forming electrodes on both surfaces of the dielectric body.

* * * * *